(12) United States Patent
Kenney

(10) Patent No.: US 6,988,269 B1
(45) Date of Patent: Jan. 17, 2006

(54) EMPLOYMENT OF INSTRUCTION IN PROGRAM SUPPORTED BY SERVER APPLICATION TO CAUSE EXECUTION OF PROGRAM UNSUPPORTED BY THE SERVER APPLICATION

(75) Inventor: Mark Phillip Kenney, McLean, VA (US)

(73) Assignee: Litton Industries Inc., Woodland Hills, CA (US)

( * ) Notice: Subject to any disclaimer, the term of this patent is extended or adjusted under 35 U.S.C. 154(b) by 319 days.

(21) Appl. No.: 09/695,549

(22) Filed: Oct. 24, 2000

(51) Int. Cl.
G06F 3/00 (2006.01)
G06F 9/44 (2006.01)
G06F 9/46 (2006.01)
G06F 13/00 (2006.01)

(52) U.S. Cl. .................................... 719/310
(58) Field of Classification Search ............... 709/310, 709/311; 910/310–320; 719/328–330
See application file for complete search history.

(56) References Cited

U.S. PATENT DOCUMENTS 5,859,972 A * 1/1999 Subramaniam et al. ..... 709/203
6,314,469 B1 * 11/2001 Tan et al. ................... 709/245
6,323,881 B1 * 11/2001 Broulik et al. .............. 345/744

OTHER PUBLICATIONS

Graham, Web/HTML Documentation and Developer's Resource, Mar. 12, 1996.*
Graham, Introduction to HTML, Jan. 5, 1998, Chapters 8 and 9.*
Birznieks et al, CGI Programming with Perl, Chapter 2, 2001.*

* cited by examiner

Primary Examiner—Meng-Al T. An
Assistant Examiner—Diem Cao
(74) Attorney, Agent, or Firm—Patti & Brill, LLC

(57) ABSTRACT

A component of a system receives a first instruction at a server to execute a target program that is unsupported by a server application. The server application is located on the server. A component of the system employs a second instruction in the supported program to cause execution of the target program. The second instruction is based on the first instruction. The supported program is supported by the server application.

18 Claims, 3 Drawing Sheets

EMPLOYMENT OF INSTRUCTION IN PROGRAM SUPPORTED BY SERVER APPLICATION TO CAUSE EXECUTION OF PROGRAM UNSUPPORTED BY THE SERVER APPLICATION

TECHNICAL FIELD

The invention in one embodiment relates generally to programs and more particularly to execution of a program that is unsupported by a certain server application.

BACKGROUND

A typical server, such as a World Wide Web ("Web") server, acts as a gateway between the Internet and one or more databases. Usually, a server application on the World Wide Web server executes programs written in some, but not all, (e.g., computer) languages.

One system requires a separate, external application server to effect execution of a program that comprises instructions written in a computer language that is unsupported by any server application on the World Wide Web server. This requirement for the separate, external application server disadvantageously increases one or more of the following: the total cost of the system, the complexity of the system, and the support and maintenance needed for the system.

Thus, a need exists for a decrease in the amount of resources that are required to cause execution of a program that is written in a language which is unsupported by a server application.

SUMMARY

Pursuant to one embodiment of the invention, shortcomings of the existing art are overcome and additional advantages are provided through the provision of employment of an instruction in a program supported by a server application to cause execution of a program unsupported by the server application.

The invention in one embodiment encompasses a method. A first instruction to execute a target program that is unsupported by a server application is received at a server. The server application is located on the server. A second instruction is employed in a supported program to cause execution of the target program. The second instruction is based on the first instruction. The supported program is supported by the server application.

Another embodiment of the invention encompasses a system. The system includes a component that receives a first instruction at a server to execute a target program that is unsupported by a server application. The server application is located on the server. The system includes a component that employs a second instruction in a supported program to cause execution of the target program. The second instruction is based on the first instruction. The supported program is supported by the server application.

A further embodiment of the invention encompasses an article. The article includes a computer-readable signal-bearing medium. The article includes means in the medium for receiving a first instruction at a server to execute a target program that is unsupported by a server application. The server application is located on the server. The article includes means in the medium for employing a second instruction in a supported program to cause execution of the target program. The second instruction is based on the first instruction. The supported program is supported by the server application.

DETAILED DESCRIPTION

In one embodiment of the invention, a first instruction to execute a target program that is unsupported by a server application is received at a server with the server application located on the server, and a second instruction is employed in a supported program to cause execution of the target program with the second instruction based on the first instruction and with the supported program supported by the server application.

A detailed discussion of one exemplary embodiment of the invention is presented herein, for illustrative purposes.

Figure 1:
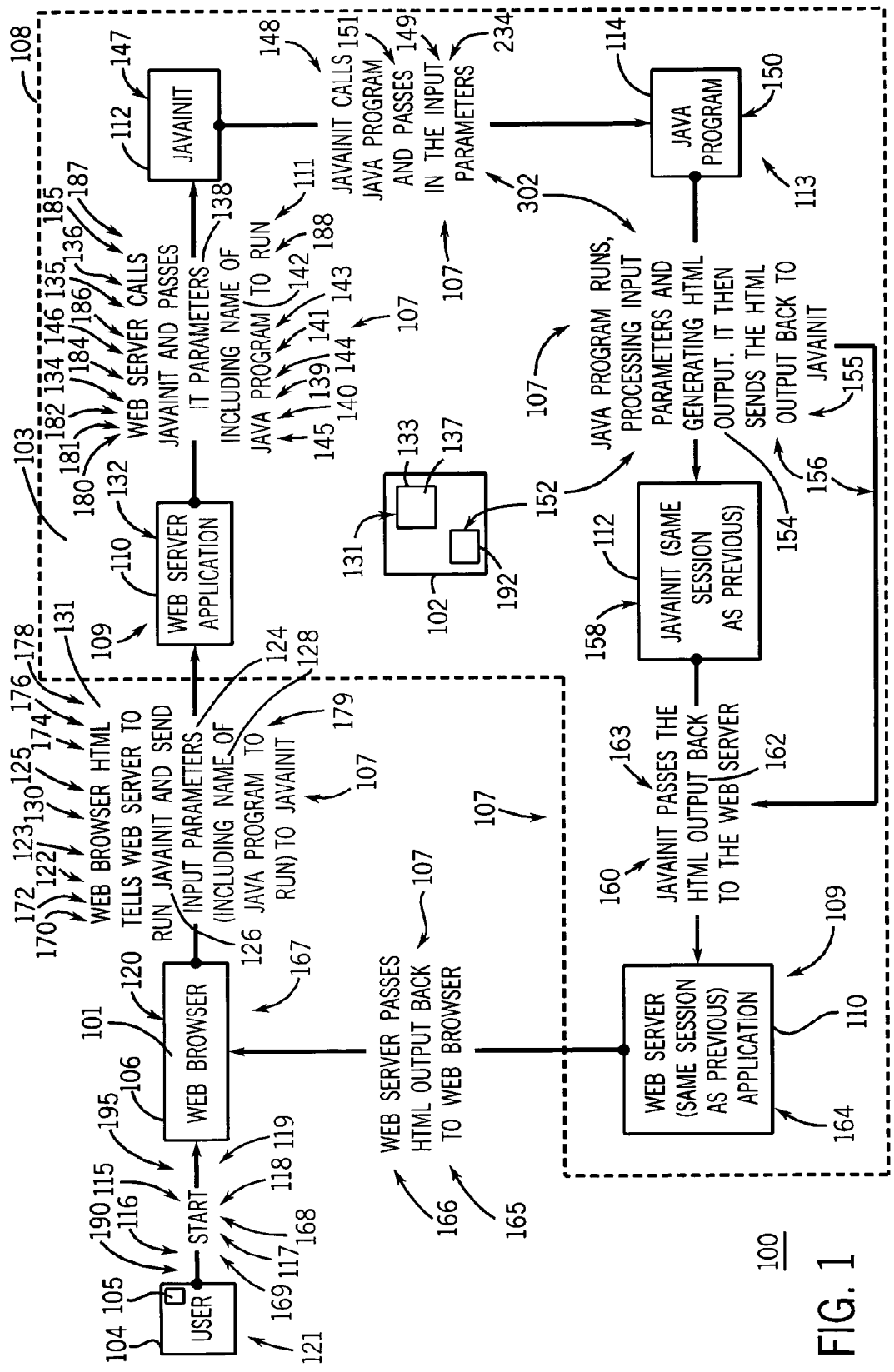
FIG. 1 is a functional block diagram of one example of a system that includes a user, a browser, one or more passages, and a server.

Turning to FIG. 1, system 100, in one example, includes a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises an instance of recordable data storage medium 102 such as one or more of a magnetic, optical, biological, and atomic data storage medium. In another example, a computer-readable signal-bearing medium for system 100 comprises a modulated carrier signal transmitted over a network comprising or coupled with system 100, for instance, one or more of a telephone network, a local area network ("LAN"), the Internet, and a wireless network. An exemplary component of system 100 employs and/or comprises a series of computer instructions written in or implemented with any of a number of programming languages, as will be appreciated by those skilled in the art.

Referring again to FIG. 1, system 100 in one example comprises one or more components, for example, user 104, browser 106, one or more instances of passage 107, and server 108.

Still referring to FIG. 1, user 104 in one example comprises a human operator. In a further example, user 104 comprises a computational device. For example, user 104 employs and/or comprises display 105.

Again referring to FIG. 1, browser 106 in one example comprises a World Wide Web ("Web") browser. For example, browser 106 comprises type 101. Exemplary instances of type 101 of browser 106 comprise Microsoft® Internet Explorer and Netscape Navigator.

Figure 3:
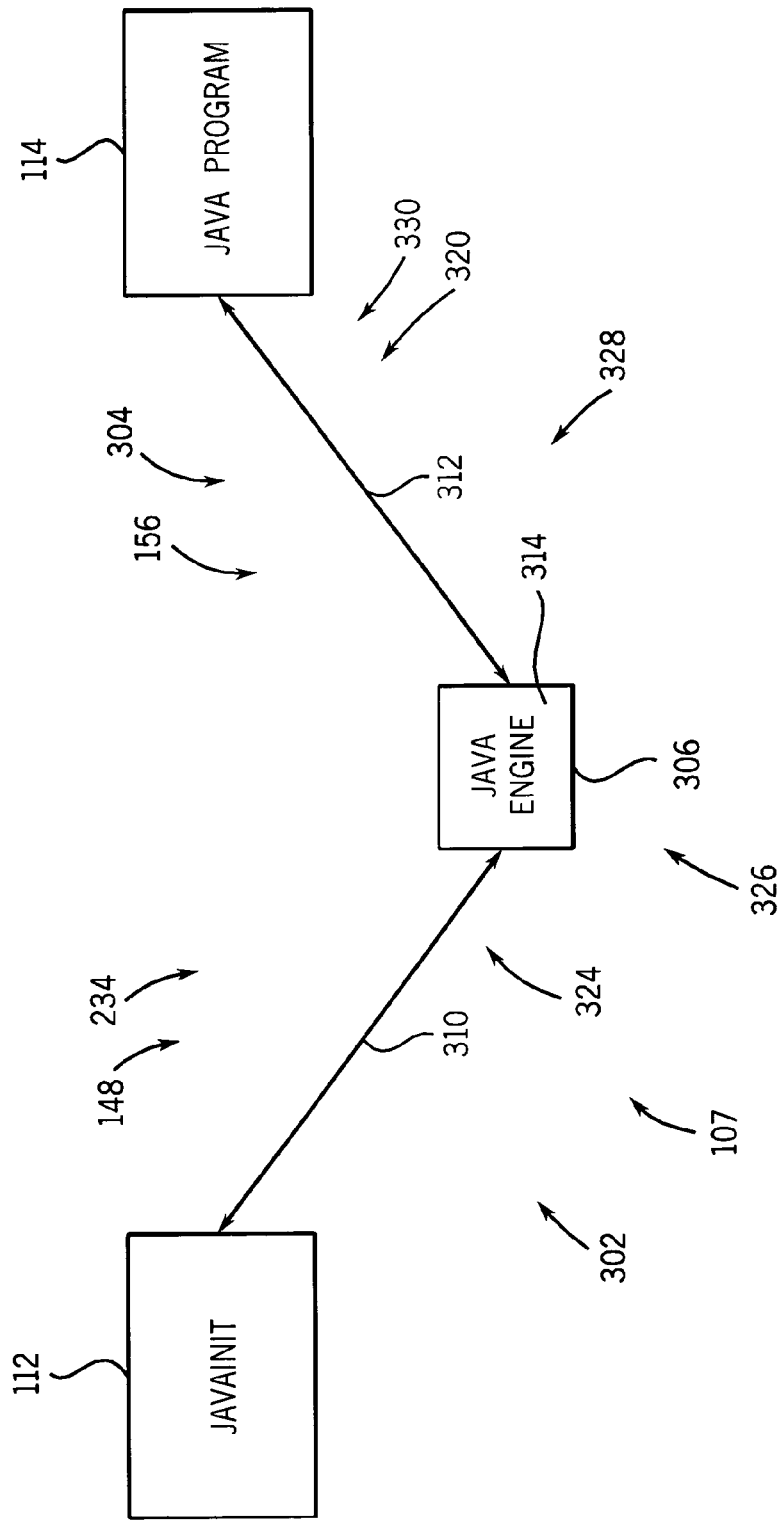
FIG. 3 illustrates exemplary details of one example of a passage of FIG. 1.

Referring further to FIG. 1, passage 107 in one example comprises a communications passage. In one example, passage 107 comprises a number of portions of one or more of an electrical path, an optical path, a wireless path, a wireline path, a hardware path, and a software path. One exemplary instance of passage 107 comprises passage 302 (FIG. 3).

Referring still to FIG. 1, server 108 in one example comprises a World Wide Web server. In one example, server 108 comprises base 103, server program 109, facilitation program 112, and target program 114. For example, server program 109, facilitation program 112, and target program 114 are located on base 103.

Further referring to FIG. 1, base 103 in one example comprises a foundation of functionality for server 108. For example, base 103 comprises a hardware component and/or implementation.

Referring again to FIG. 1, server program 109 in one example comprises server application 110. Server application 110 in one example comprises a World Wide Web server application. In one example, server application 110 supports facilitation program 112. For example, server application 110 (e.g., natively) executes facilitation program 112.

Still referring to FIG. 1, facilitation program 112 in one example comprises a script such as a Perl script. In one example, facilitation program 112 comprises a common gateway interface ("CGI") program. In a further example, facilitation program 112 serves to cause execution of target program 114. Target program 114 in one example comprises a program implemented with and/or written in a programming language such as Java. Additional illustrative details of one example of facilitation program 112 and target program 114 are presented herein, for explanatory purposes.

Further referring to FIG. 1, at STEP 116 in one example user 104 sends information 118 to browser 106. Information 118 in one example comprises one or more of a number of instructions 115, number 117, address 119, input 190, and environmental information 195. Instructions 115 in one example serve to (e.g., indirectly) cause execution of facilitation program 112 and/or target program 114. For example, one or more of instructions 115 serve to (e.g., indirectly) cause and/or initiate execution of facilitation program 112.

Again referring to FIG. 1, in one example, at STEP 116 user 104 accesses browser 106 to engage in a (e.g., financial) transaction. For example, at STEP 116 user 104 accesses browser 106 to purchase an item (e.g., a book) through a World Wide Web-based store that comprises system 100. Input 190 in one example comprises ordering and/or purchasing information, for instance, input by user 104. Number 117 in one example comprises a credit card number for user 104. Address 119 in one example comprises a shipping address input and/or selected by user 104 and/or a billing address for user 104. Environmental information 195 in one example comprises information that relates to display 105 for user 104.

Referring further to FIG. 1, at STEP 120 in one example browser 106 employs information 118 from user 104 to obtain information 122. In one example, information 122 is based (e.g., in part) on information 118. Information 122 in one example comprises one or more of a number of instructions 125, information 123, a number of parameters 124 and 176, names 126 and 128, and location indicators 172 and 179.

Referring still to FIG. 1, in one example, instructions 125 of information 122 are based (e.g., in part) on instructions 115 of information 118 from user 104. Instructions 125 in one example serve to (e.g., indirectly) cause execution of facilitation program 112 and/or target program 114. For example, one or more instructions 125 serve to (e.g., indirectly) cause and/or initiate execution of facilitation program 112. For instance, instructions 125 are implemented with and/or written in HyperText Markup Language ("HTML"). Name 126 in one example serves to identify facilitation program 112. In one example, name 126 comprises "Javainit" as a name for facilitation program 112. Name 128 in one example serves to identify target program 114. Location indicator 172 in one example serves to locate and/or allow location of facilitation program 112. Location indicator 179 in one example serves to locate and/or allow location of target program 114.

Referring again to FIG. 1, in one example, at STEP 120 browser 106 employs page 131. Page 131 in one example comprises World Wide Web page 133. World Wide Web page 133 in one example is implemented with and/or written in HyperText Markup Language. In one example, recordable data storage medium 102 comprises page 131. For example, page 131 is located in recordable data storage medium 102. In one example, page 131 comprises code 137. Code 137 in one example comprises and/or implements one or more of instructions 125 of information 122.

Further referring to FIG. 1, information 123 of information 122 in one example comprises encrypted number 170. Encrypted number 170 in one example is based on number 117 of information 118 from user 104. For example, encrypted number 170 comprises an encrypted version of number 117. For instance, at STEP 120 browser 106 encrypts number 117 to obtain encrypted number 170.

Again referring to FIG. 1, one or more of parameters 124 of information 122 in one example serve to characterize and/or describe browser 106. Parameters 124 in one example comprise one or more environmental variables 174. One or more of environmental variables 174 in one example relate to type 101 of browser 106.

Still referring to FIG. 1, one or more of parameters 176 of information 122 in one example comprise one or more environmental variables 178. Environmental variables 178 in one example are based on environmental information 195 of information 118 from user 104. For instance, one or more of environmental variables 178 relate to display 105 for user 104.

Referring further to FIG. 1, at STEP 130 in one example browser 106 sends information 122 to server 108. For example, at STEP 130 browser 106 sends information 122 to server program 109. For instance, at STEP 130 browser 106 sends information 122 to server application 110.

Again referring to FIG. 1, at STEP 130 in one example code 137 serves to communicate name 126 and location indicator 172 (e.g., for facilitation program 112) to server application 110. In a further example, at STEP 130 code 137 serves to instruct server application 110 to execute facilitation program 112. In a still further example, at STEP 130 code 137 serves to communicate name 128 and location indicator 179 (e.g., for target program 114) to server application 110.

Referring again to FIG. 1, at STEP 132 in one example server program 109 employs information 122 from browser 106 to obtain information 134. For example, server application 110 at STEP 132 employs information 122 to obtain information 134. Information 134 in one example is based (e.g., in part) on information 122. In one example, information 134 comprises one or more of a number of instructions 135, information 138, 144, and 145, names 141 and 142, and location indicator 188.

Referring still to FIG. 1, instructions 135 of information 134 in one example are based (e.g., in part) on instructions 125 of information 122. In one example, instructions 135 serve to cause execution of facilitation program 112 and/or target program 114. One or more of instructions 135 in one example serve to (e.g., directly) cause and/or initiate execution of facilitation program 112. For example, instructions 135 comprise a number of commands 136. Name 141 in one example is based on name 126 of information 122. For example, name 141 serves to identify facilitation program 112. Location indicator 188 in one example is based on location indicator 172 of information 122. For example, location indicator 188 serves to locate and/or allow location of facilitation program 112. Name 142 in one example is based on name 128 of information 122. For example, name 142 serves to identify target program 114. Location indicator 180 in one example is based on location indicator 179 of information 122. In one example, location indicator 180 serves to locate and/or allow location of target program 114. For example, location indicator 180 comprises physical and/or logical directory information 181, for instance, of target program 114 on base 103 of server 108.

Again referring to FIG. 1, information 138 of information 134 in one example comprises a number of parameters 139, 140, and 187. Parameters 139 in one example are based on parameters 124 of information 122. In one example, parameters 139 serve to characterize and/or describe browser 106. One or more of parameters 139 in one example comprise one or more environmental variables 143. Environmental variables 143 in one example are based on environmental variables 174 of information 122. One or more of environmental variables 143 in one example relate to type 101 of browser 106. Parameters 187 in one example are based on parameters 176 of information 122. In one example, parameters 187 comprise one or more environmental variables 185. Environmental variables 185 in one example are based on environmental variables 178 of information 122. In one example, environmental variables 185 relate to display 105 for user 104.

Referring again to FIG. 1, parameters 140 of information 138 in one example serve to characterize and/or describe server program 109. For example, one or more of parameters 140 comprise one or more environmental variables 186. Environmental variables 186 in one example relate to server application 110 and/or base 103 of server 108.

Still referring to FIG. 1, information 144 of information 134 in one example comprises standard output 182. Standard output 182 in one example comprises output that conforms to a standard and/or protocol. In one example, standard output 182 comprises HyperText Markup Language output.

Further referring to FIG. 1, information 145 of information 134 in one example is based on information 123 of information 122. In one example, information 145 comprises encrypted number 184. Encrypted number 184 in one example is based on encrypted number 170 of information 122. In one example, encrypted number 170 and encrypted number 184 comprise a same encrypted number. For example, encrypted number 184 comprises an encrypted version of number 117 of information 118.

Again referring to FIG. 1, at STEP 146 in one example server program 109 sends information 134 to facilitation program 112. For example, server application 110 at STEP 146 sends information 134 to facilitation program 112. In a further example, code 137 of page 131 at STEP 146 employs server application 110 to communicate information 134 to facilitation program 112.

Referring still to FIG. 1, server application 110 in one example at STEP 146 employs information 134 to (e.g., directly) execute facilitation program 112. In one example, server application 110 communicates to facilitation program 112 input 190 from user 104, environmental variables 174 from browser 106, environmental variables 186 that relate to server application 110 and/or base 103, and name 142 and location indicator 180 for target program 114.

Referring further to FIG. 1, at STEP 147 in one example facilitation program 112 employs information 134 to obtain information 148. Information 148 in one example comprises (e.g., in part) one or more instructions 149. In one example, instructions 149 are based (e.g., in part) on instructions 135 of information 134. For example, facilitation program 112 (e.g., in part) serves to modify one or more of instructions 135 to obtain one or more of instructions 149. One or more of instructions 149 in one example serve to (e.g., directly) cause and/or initiate execution of target program 114.

Still referring to FIG. 1, instructions 135 of information 134 at facilitation program 112 in one example are unsupported by target program 114. For example, instructions 135 comprise form 111 that is unrecognized directly by target program 114. At STEP 147 in one example facilitation program 112 modifies form 111 of instructions 135 to obtain instructions 149 that comprise form 151 that is recognized (e.g., directly) by target program 114. For instance, server program 109 at STEP 146 sends instructions 135 that comprise form 111 of HyperText Markup Language, and facilitation program 112 at STEP 147 modifies instructions 135 to obtain instructions 149 that comprise form 151 of Java programming language. In a further example, interpreter 314 (FIG. 3) serves to pass instructions 149 for use during (e.g., direct) execution of a Java program that comprises target program 114.

Figure 2:
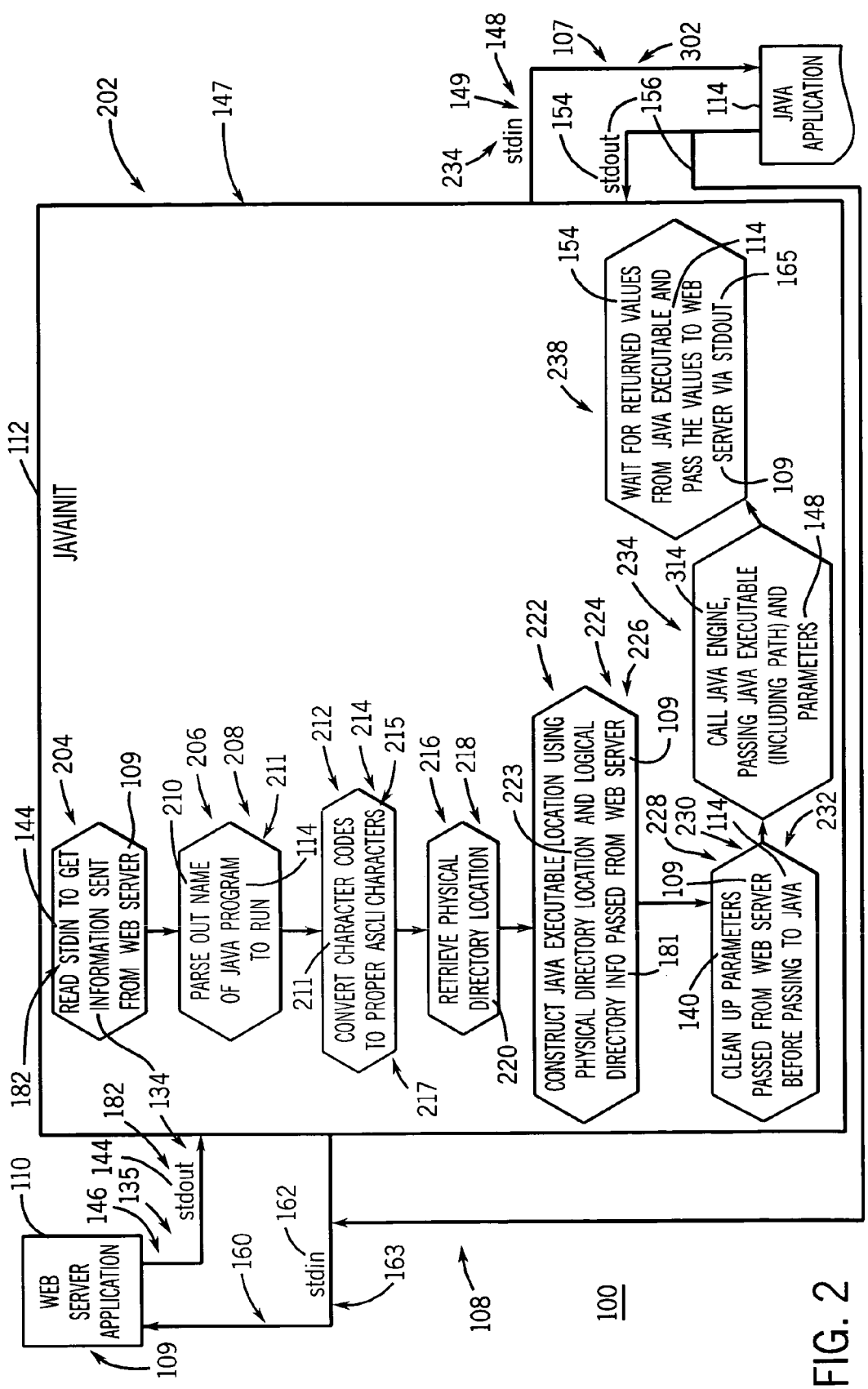
FIG. 2 represents illustrative details of one of example of logic that is employed by the server of FIG. 1.

Turning to FIG. 2, facilitation program 112 in one example at STEP 147 employs exemplary logic 202. Exemplary logic 202 in one example accepts information 134 as input. In a further example, exemplary logic 202 outputs information 148. For instance, exemplary logic 202 (e.g., in part) serves to modify one or more of instructions 135 of information 134 to obtain one or more of instructions 149 of information 148. In one example, exemplary logic 202 comprises one or more of STEPS 204, 206, 212, 216, 222, 228, 234, and 238.

Referring again to FIG. 2, STEP 204 in one example receives (e.g., part of) information 134. For example, STEP 204 receives (e.g., reads) information 144 of information 134. For instance, STEP 204 accesses standard output 182 of information 134. STEP 204 in one example proceeds to STEP 206.

Still referring to FIG. 2, STEP 206 in one example employs (e.g., part of) information 134 to obtain information 208. Information 208 in one example is based (e.g., in part) on information 134. In one example, information 208 comprises name 210 and/or one or more characters 211. Name 210 in one example serves to identify target program 114. For example, name 210 is based on name 142 of information 134. STEP 206 in one example serves to parse information 134 to obtain name 210. In a further example, STEP 206 modifies name 142 to obtain name 210. For instance, STEP 206 reformats name 142 to obtain name 210. In one example, name 210 comprises characters 211. Characters 211 in one example comprise code. For example, characters 211 comprise HyperText Markup Language characters. STEP 206 in one example proceeds to STEP 212.

Further referring to FIG. 2, STEP 212 in one example employs information 208 to obtain information 214. Information 214 in one example is based (e.g., in part) on information 208. In one example, information 214 comprises one or more characters 215. Characters 215 in one example comprise code. For instance, characters 215 comprise American Standard Code for Information Interchange ("ASCII") characters. In one example, characters 215 are based on characters 211 of information 208. For example, STEP 212 serves to convert characters 211 (e.g., that comprise HyperText Markup Language characters) into characters 215. Characters 211 that comprise HyperText Markup Language characters in one example comprise a subset of characters 215 that comprise American Standard Code for Information Interchange characters. Characters 215 in one example comprise name 217. Name 217 in one example is based on name 210 from information 208. In one example, name 217 serves to identify target program 114. STEP 212 in one example proceeds to STEP 216.

In one example, referring to FIG. 2, STEP 216 employs (e.g., in part) information 214 to obtain information 218. Information 218 in one example is based (e.g., in part) on information 134. For example, information 218 comprises location indicator 220. Location indicator 220 in one example is based on location indicator 180 of information 134. For instance, location indicator 220 serves to indicate and/or identify (e.g., physical) location 113 of target program 114 on base 103 (FIG. 1) of server 108. For example, STEP 216 employs location indicator 180 to obtain location indicator 220. In a further example, location indicator 220 is based on physical and/or logical directory information 181 of information 134. For instance, STEP 216 employs physical and/or logical directory information 181 to obtain location indicator 220.

In another example, referring to FIG. 2, STEP 216 retrieves information 218 from (e.g., base 103, FIG. 1, of) server 108. For example, information 218 comprises location indicator 220. For instance, location indicator 220 serves to indicate and/or identify (e.g., physical) location 113 of target program 114 on base 103 of server 108.

Referring again to FIG. 2, STEP 216 in one example proceeds to STEP 222. STEP 222 in one example employs information 218 to obtain information 224. Information 224 in one example comprises location indicator 226. Location indicator 226 in one example is based on location indicator 220 of information 218. In one example, location indicator 226 serves to identify location 223 on base 103 of server 108 for execution of target program 114. For example, STEP 222 employs location indicator 220 to obtain (e.g., identify) location indicator 226. In one example, STEP 222 obtains (e.g., constructs) location 223 through employment of (e.g., a portion of) information 218 that is based (e.g., in part) on location identifier 180 and/or physical and/or logical directory information 181 of information 134. For example, STEP 222 employs physical and/or logical directory information 181 to obtain (e.g., construct) location 223. STEP 222 in one example proceeds to STEP 228.

Still referring to FIG. 2, STEP 228 in one example employs (e.g., part of) information 134 to obtain information 230. For example, STEP 228 employs information 138 of information 134 to obtain information 230. For instance, STEP 228 employs one or more of parameters 140 (e.g., that serve to characterize and/or describe server program 109) to obtain information 230. In one example, STEP 228 employs parameters 140 to obtain information 230. For example, STEP 228 modifies (e.g., reformats) parameters 140 to obtain information 230. In one example, information 230 comprises output such as standard output 232. Standard output 232 in one example comprises output that conforms to and/or operates with a programming language such as Java. STEP 228 in one example proceeds to STEP 234.

Referring now to FIGS. 2–3, STEP 234 in one example sends information 148 to target program 114 and/or interpreter 314. In one example, STEP 234 initiates execution of target program 114. For instance, STEP 234 sends instructions 149 that serve to cause and/or initiate execution of target program 114. For example, STEP 234 employs an instance of passage 107 such as passage 302 to communicate information 148 to target program 114 and/or interpreter 314. In one example, passage 302 serves to communicate instructions 149 (FIG. 1) of information 148 from facilitation program 112 to target program 114.

Now referring to FIGS. 1 and 3, passage 302 in one example comprises one or more instances of link 304 and/or component 306. Link 304 in one example comprises a communications link. Exemplary instances of link 304 comprise links 310 and 312. Link 310 in one example extends between facilitation program 112 and component 306. Link 312 in one example extends between component 306 and target program 114.

Referring still to FIGS. 1 and 3, component 306 in one example comprises interpreter 314. Interpreter 314 in one example comprises a Java interpreter and/or a Java engine. For example, interpreter 314 passes (e.g., part of) information 148 from facilitation program 112 to target program 114, to allow target program 114 to run. For instance, interpreter 314 employs instructions 149 of information 148 that comprise form 151 of Java programming language, to obtain Java executable program 320 that target program 114 runs. In a further example, interpreter 314 receives information 154 from target program 114 for passing to facilitation program 112. For example, interpreter 314 receives output from target program 114 that runs Java executable program 320 to obtain HyperText Markup Language and/or American Standard Code for Information Interchange output. Interpreter 314 in one example passes HyperText Markup Language and/or American Standard Code for Information Interchange output to facilitation program 112, for passing of HyperText Markup Language and/or American Standard Code for Information Interchange output to server program 109.

Again referring to FIGS. 1 and 3, STEP 234 in one example employs one or more of STEPS 324, 326, and 328. At STEPS 324, 326, and 328 in one example facilitation program 112 employs link 310, component 306, and link 312 to cause execution of target program 114. At STEP 324 in one example facilitation program 112 sends (e.g., a portion of) information 148 across link 310. At STEP 326 in one example component 306 employs (e.g., a portion of) information 148 to obtain information 330. Information 330 in one example comprises Java executable program 320. At STEP 328 in one example component 306 sends information 330 to target program 114.

Further referring to FIGS. 1 and 3, at STEP 150 in one example target program 114 employs information 148 to obtain information 154. In one example, information 154 is based (e.g., in part) on information 152. For example, STEP 150 employs an instance of passage 107 such as passage 302 to obtain information 154. Information 152 in one example is stored in database 192. Recordable data storage medium 102 in one example comprises database 192. For instance, database 192 is located in recordable data storage medium 102. Target program 114 in one example employs information 148 to access (e.g., retrieve) information 152, for example, from database 192. In one example, information 154 comprises standard output 155. Standard output 155 in one example conforms to a standard such as a HyperText Markup Language and/or American Standard Code for Information Interchange standard.

Still referring to FIGS. 1 and 3, in one example, at STEP 150 target program 114 and/or interpreter 314 serve to produce standard output 155. For example, target program 114 and/or interpreter 314 serve to employ information that conforms to a first standard (e.g., a Java programming language standard) and produce output that conforms to a second standard (e.g., a HyperText Markup Language and/or American Standard Code for Information Interchange standard). In a further example, information 154 comprises a confirmation that target program 114 has executed a transaction for user 104. For instance, information 154 comprises a confirmation that a credit card number for user 104 has been billed for a transaction.

Again referring to FIGS. 1 and 3, at STEP 156 in one example target program 114 and/or interpreter 314 serve to send information 154 to facilitation program 112 and/or server program 109. In one example, target program 114 and interpreter 314 at STEP 156 serve to send information 154 to facilitation program 112. In another example, target program 114 and interpreter 314 at STEP 156 serve to send information 154 to server program 109.

Referring to FIGS. 1–3, in one example in which facilitation program 112 receives information 154 from target program 114, facilitation program 112 at STEP 238 waits for a completion of execution of target program 114. In one example, STEP 238 waits for information 154 from target program 114 and/or passage 302. For example, STEP 238 waits for a confirmation that target program 114 has executed a transaction for user 104.

Referring to FIG. 1, at STEP 158 in one example facilitation program 112 employs information 154 to obtain information 160. Information 160 in one example comprises standard output 162. Standard output 162 in one example conforms to a standard such as a HyperText Markup Language and/or American Standard Code for Information Interchange standard.

Still referring to FIG. 1, at STEP 163 in one example, facilitation program 112 sends information 160 to server program 109.

Referring further to FIG. 1, at STEP 164 in one example server program 109 employs information 154 and/or 163 to obtain information 165. Information 165 in one example conforms to a standard such as a HyperText Markup Language and/or American Standard Code for Information Interchange standard.

Referring still to FIG. 1, at STEP 166 in one example server program 109 sends information 165 to browser 106.

Again referring to FIG. 1, at STEP 167 in one example, browser 106 employs information 166 to obtain information 168. Information 168 in one example conforms to a standard such as a HyperText Markup Language and/or American Standard Code for Information Interchange standard.

Referring still to FIG. 1, at STEP 169 in one example browser 106 sends information 168 to user 104.

Further referring to FIG. 1, at STEP 121 in one example user 104 accesses and/or employs information 168. For example, STEP 121 (e.g., in part) serves to present information 168 on display 105 for user 104.

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method implemented by a server comprising the steps of:
receiving first information having at least a first instruction, names, and location indicators at the server to execute a target program that is unsupported by a server application, wherein the names identify the server application and the target program where both the server application and the target program are located on the server, and wherein the location indicators serve to locate the server application and the target program, and wherein the name of the target program is received in a format not understood by a supported program residing on the server; and
employing the supported program residing on the server to convert the name and the location indicator of the target program into a format understood by the supported program and a second instruction in the supported program causing execution of the target program, wherein the second instruction is based on the first instruction, wherein the supported program is supported by the server application.

2. The method of claim 1, further comprising the step of parsing the received names to identify the name of the target program.

3. The method of claim 2, wherein the step of parsing comprises the step of converting character codes representing the name of the target program as received by the server application into ASCII characters.

4. The method of claim 3 further comprising the step of identifying a directory location of the target program in the server based on the ASCII characters and the converted location indicator.

5. The method of claim 4 wherein the step of identifying the directory location of the target program comprises identifying the directory location of a JAVA program that is the target program.

6. The method of claim 1, wherein the step of employing the second instruction in the supported program to cause execution of the target program comprises the steps of:
determining an output of the target program; and
sending the output to the supported program.

7. The method of claim 1, wherein the step of employing the second instruction in the supported program to cause execution of the target program comprises the step of selecting the supported program to comprise a common gateway interface program.

8. The method of claim 1, wherein the step of employing the second instruction in the supported program to cause execution of the target program comprises the step of modifying the first instruction to obtain the second instruction.

9. The method of claim 1 wherein the target program is a JAVA program contained on the server.

10. A server, comprising:
a component that receives first information having at least a first instruction, names, and location indicators to execute a target program that is unsupported by a server application, wherein the names identify the server application and the target program where both the server application and the target program are located on the server, and wherein the location indicators serve to locate the server application and the target program, and wherein the name of the target program is received in a format not understood by a supported program residing on the server; and a component that employs the supported program to convert the name and the location indicator of the target program into a format understood by the supported program and a second instruction in the supported program causing execution of the target program, wherein the second instruction is based on the first instruction, wherein the supported program is supported by the server application.

11. The server of claim 10, further comprising a parsing component that parses the received names to identify the name of the target program.

12. The server of claim 11, wherein the parsing component comprises a component that converts character codes representing the name of the target program as received by the server application into ASCII characters.

13. The server of claim 12 further comprising a component that identifies a directory location of the target program in the server based on the ASCII characters and the converted location indicator.

14. The server of claim 13 wherein the identifying component identifies the directory location of a JAVA program that is the target program.

15. The server of claim 10, wherein the component that employs the second instruction in the supported program to cause execution of the target program comprises:
   a component that determines an output of the target program; and
   a component that sends the output to the supported program.

16. The server of claim 10, wherein the component that employs the second instruction in the supported program to cause execution of the target program comprises a component that selects the supported program to comprise a common gateway interface program.

17. The server of claim 10, wherein the component that employs the second instruction in the supported program to cause execution of the target program comprises a component that modifies the first instruction to obtain the second instruction.

18. The server of claim 10 wherein the target program is a JAVA program contained on the server.

* * * * *